(12) United States Patent
Schoenthal et al.

(10) Patent No.: US 7,424,637 B1
(45) Date of Patent: Sep. 9, 2008

(54) TECHNIQUE FOR MANAGING ADDITION OF DISKS TO A VOLUME OF A STORAGE SYSTEM

(75) Inventors: Scott Schoenthal, San Ramon, CA (US); Sunitha S. Sankar, San Jose, CA (US); Loellyn J. Cassell, Pleasanton, CA (US)

(73) Assignee: Networks Appliance, Inc., Sunnyvale, CA (US)

( * ) Notice: Subject to any disclaimer, the term of this patent is extended or adjusted under 35 U.S.C. 154(b) by 490 days.

(21) Appl. No.: 10/394,810

(22) Filed: Mar. 21, 2003

(51) Int. Cl.
*G06F 11/00* (2006.01)

(52) U.S. Cl. .............................. 714/6; 714/7; 711/161; 711/162

(58) Field of Classification Search .................... 714/6, 714/7; 711/161, 162
See application file for complete search history.

(56) References Cited

U.S. PATENT DOCUMENTS

| | | | |
|---|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schillling et al. |
| 4,870,643 A | 9/1989 | Bultman et al. |
| 4,899,342 A | 2/1990 | Potter et al. |

(Continued)

OTHER PUBLICATIONS

"Checksum" "Sector" Microsoft Computer Dicitonary (fifth edition). (c) 2002. Microsoft Press.*

(Continued)

*Primary Examiner*—Robert W Beausoliel, Jr.
*Assistant Examiner*—Philip Guyton
(74) *Attorney, Agent, or Firm*—Cesari and McKenna LLP

(57) ABSTRACT

A technique manages the addition of disks to a volume of a storage system. A disk addition procedure is encapsulated into a DISKADD object conforming to a configuration management framework used to implement a RAID subsystem of the storage system. The DISKADD object is responsible for determining a set of available disks required to satisfy a disk addition request issued by an operator through a user interface of a storage operating system executing on the storage system. Furthermore, the DISKADD object is responsible for monitoring the state of the disks, including preparation/initialization of the disks (e.g., disk zeroing) and possible disk failures, as well as placing those disks into RAID groups of the volume once preparation completes. Persistent storage of the state of a pending disk addition is then accomplished using an implementation of the configuration management framework.

4 Claims, 8 Drawing Sheets

U.S. PATENT DOCUMENTS

| | | | |
|---|---|---|---|
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,305,326 | A | 4/1994 | Solomon et al. |
| 5,351,246 | A | 9/1994 | Blaum et al. |
| 5,410,667 | A | 4/1995 | Belsan et al. |
| 5,537,567 | A | 7/1996 | Galbraith et al. |
| 5,579,475 | A | 11/1996 | Blaum et al. |
| 5,623,595 | A | 4/1997 | Bailey |
| 5,758,050 | A * | 5/1998 | Brady et al. .................. 714/1 |
| 5,758,118 | A * | 5/1998 | Choy et al. ................. 711/114 |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,963,962 | A | 10/1999 | Hitz et al. |
| 6,038,570 | A | 3/2000 | Hitz et al. |
| 6,092,215 | A | 7/2000 | Hodges et al. |
| 6,138,201 | A | 10/2000 | Rebalski |
| 6,158,017 | A | 12/2000 | Han et al. |
| 6,223,300 | B1 | 4/2001 | Gotoh |
| 6,351,825 | B1 * | 2/2002 | Kaneda et al. ................ 714/27 |
| 6,532,548 | B1 | 3/2003 | Hughes |
| 6,549,977 | B1 * | 4/2003 | Horst et al. ................. 711/113 |
| 6,581,185 | B1 | 6/2003 | Hughes |
| 6,836,832 | B1 * | 12/2004 | Klinkner .................... 711/170 |
| 6,952,794 | B2 * | 10/2005 | Lu ............................. 714/7 |
| 2004/0260967 | A1 * | 12/2004 | Guha et al. .................... 714/3 |
| 2006/0075283 | A1 * | 4/2006 | Hartung et al. ................ 714/5 |

OTHER PUBLICATIONS

"Hard Disk" Wikipedia. http://www.wikipedia.com.*

Anvin, Peter, H, "*The Mathematics of RAID 6,*" Dec. 2004.

Auspex 4Front NS2000, System Architecture, Network-Attached Storage For a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Schadowing*, Proceedings of the 14th VLDB Conference, LA, CA (1988).

Bultman, David L., *High Performance SCSI Using Parallel Drive Technology*, In Proc. BUSCON Conf., pp. 40-44, Anaheim, CA, Feb. 1988.

Chen, Peter et al., *Two papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M.., et al, Maximizing Performance in a Striped Disk Array, Proc. 1990 *ACM SIGARCH 17th Intern. Symp. on Comp. Arch.*, Seattle, WA, May 1990, pp. 322-331.

Chen, Peter M., et al., *RAID:High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., "*A Comparison of High-Availability Media Recovery techniques*," in Proc. ACM-SIGMOD Int. Conf. Management od Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A. et al., *Coding Techniques for Handling Failures in Large Disk Arrays*, Technical Report UCB/CSD 88/477, Computer Science Division, University of California, (Jul. 1988).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., *High Performance RAIT* , Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al., *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., Optimizing Shadow Recovery Algorithms, *IEEE Transactions on Software Engineering*, 14(2):155-168, Feb. 1988.

Kim,. Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Li, Don, et al., *Authors' Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

NG, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17(3):109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Storagesuite "Performance Without Compromise: The Virtual Storage Architecture," catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14$^{th}$ VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

Tekrom—"About RAID 6".

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

U.S. Appl. No. 10/035,607, Peter P. Corbett et al.

U.S. Appl. No. 10/394,819, Loellyn J. Cassell.

David Hitz et al. TR3002 File System Design for a NFS File Server Appliance published by Network Appliance, Inc.

Common Internet File Systems (CIFS) Version: CIFS-Spec 0.9, Storage Networking Industry Association (SNIA), Draft SNIA CIPS Documentation Work Group Work-in-Progress, Revision Date: Mar. 26, 2001.

Fielding et al., (1999) Request for Comments (RFC) 2616, HTTP/1.1.

\* cited by examiner

TECHNIQUE FOR MANAGING ADDITION OF DISKS TO A VOLUME OF A STORAGE SYSTEM

CROSS-REFERENCE TO RELATED APPLICATION

The present invention is related to the following co-pending and commonly assigned U.S. patent application Ser. No. 10/394,819 titled, Query-Based Spares Management Technique, which was filed on even date herewith and which application is hereby incorporated by reference as though fully set forth herein.

FIELD OF THE INVENTION

The present invention relates to storage systems and, more specifically, to a technique for managing the addition of disks to a volume of a storage system.

BACKGROUND OF THE INVENTION

A storage system typically comprises one or more storage devices into which data may be entered, and from which data may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with a hard disk drive (HDD), a direct access storage device (DASD) or a logical unit number (lun) in a storage device.

Storage of information on the disk array is preferably implemented as one or more storage "volumes", defining an overall logical arrangement of disk space. The disks within a volume are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information may thereafter be retrieved to enable recovery of data lost when a storage device fails.

In the operation of a disk array, it is anticipated that a disk can fail. A goal of a high performance storage system is to make the mean time to data loss as long as possible, preferably much longer than the expected service life of the system. Data can be lost when one or more disks fail, making it impossible to recover data from the device. Typical schemes to avoid loss of data include mirroring, backup and parity protection. Mirroring stores the same data on two or more disks so that if one disk fails, the "mirror" disk(s) can be used to serve (e.g., read) data. Backup periodically copies data on one disk to another disk. Parity schemes are common because they provide a redundant encoding of the data that allows for loss of one or more disks without the loss of data, while requiring a minimal number of disk drives in the storage system.

Parity protection is often used in computer systems to protect against loss of data on a storage device, such as a disk. A parity value may be computed by summing (usually modulo 2) data of a particular word size (usually one bit) across a number of similar disks holding different data and then storing the results on the disk(s). That is, parity may be computed on 1-bit wide vectors, composed of bits in predetermined positions on each of the disks. Addition and subtraction on 1-bit vectors are an equivalent to exclusive-OR (XOR) logical operations; these addition and subtraction operations can thus be replaced by XOR operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then sub-tracting the result from the stored parity.

Typically, the disks are divided into parity groups, a common arrangement of which comprises one or more data disks and a parity disk. The disk space is divided into stripes, with each stripe containing one block from each disk. The blocks of a stripe are usually at equivalent locations on each disk in the parity group. Within a stripe, all but one block contain data ("data blocks") with the one block containing parity ("parity block") computed by the XOR of all the data. If the parity blocks are all stored on one disk, thereby providing a single disk that contains all (and only) parity information, a RAID-4 level implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

Often other types of parity groupings are supported by a storage system. For example, a RAID-0 level implementation has a minimum of one data disk per parity group. However, a RAID 0 group provides no parity protection against disk failures, so loss of a single disk translates into loss of data in that group. A row-diagonal parity implementation has two parity disks per group for a minimum of three disks per group, i.e., one data and two parity disks. An example of a row-diagonal (RD) parity implementation is described in U.S. patent application Ser. No. 10/035,607 titled, Row-Diagonal Parity Technique for Enabling Efficient Recovery from Double Failures in a Storage Array and filed Dec. 28, 2001. A RD parity group can survive the loss of up to two disks in the RAID group.

The storage operating system of the storage system typically includes a RAID subsystem that manages the storage and retrieval of information to and from the disks in accordance with input/output (I/O) operations. In addition, the storage operating system includes administrative interfaces, such as a user interface, that enable operators (system administrators) to access the system in order to implement, e.g., configuration management decisions. Configuration management in the RAID subsystem generally involves a defined set of modifications to the topology or attributes associated with a storage array, such as a disk, a RAID group, a volume or set of volumes. Examples of these modifications include, but are not limited to, disk failure handling, volume splitting, volume online/offline, changes to (default) RAID group size or checksum mechanism and, notably, disk addition.

Typically, the configuration decisions are rendered through a user interface oriented towards operators that are knowledgeable about the underlying physical aspects of the system. That is, the interface is often adapted towards physical disk structures and management that the operators may manipulate in order to present a view of the storage system on behalf of a client. For example in the case of adding disks to a volume, an operator may be prompted to specify (i) exactly which disks are to be added to a specified volume, or (ii) a count of the number of disks to add, leaving the responsibility for selecting disks up to the storage operating system.

Once disks have been selected, the storage operating system may determine placement of the disks into the volume. In some cases, the operator is allowed to override the system and specify a placement strategy. Placement strategies are generally based on optimizing for disk capacity and projected I/O performance. Placement of the disks into the volume may involve determining into which RAID group to place a disk and whether the disk should be used as, e.g., a RAID-4 level parity disk or data disk. A RAID-4 level implementation requires that the parity disk have a capacity at least as large as any data disk in its contained RAID group. Depending on the configuration of the volume, the addition of disks may require the creation of new RAID groups for optimal placement.

The storage operating system may also attempt to place disks subject to a maximum RAID group size constraint. This RAID group size constraint is the maximum number of disks allowed in a RAID group. For example, if a RAID group size is set to "5", then the number of disks in the group can be less than or equal to 5, but not more than 5. The number of disks includes data and parity (if applicable) disks. The RAID group size is typically a property of the volume, such that all RAID groups of a volume have the same RAID group size. Often, the operator is allowed to specify the maximum size for RAID groups within the volume.

However, it is desirable for the storage operating system to address other issues that factor into the selection of disks, as well as initial and on-going disk placement decisions. These issues include the use of similarly sized disks for RAID mirroring implementations, and the disk checksum mechanism used for a RAID group and, in particular, ensuring that selection and placement of disks into RAID groups conform to disk format block size constraints imposed by the checksum mechanism, if applicable. Moreover, it is desirable to store the state of a disk addition across system reboot operations using persistent storage techniques. In prior systems, a reboot operation may "erase" knowledge of the pending disk addition from the operating system.

For a RAID-1 (mirroring) implementation, it is also desirable to mirror disks of the same size. The use of similarly sized disks for RAID mirroring further imposes a requirement to identify and match disks of the same size when adding disks to a mirrored volume. A failure of a disk during a conventional disk zeroing (i.e., disk initialization) procedure may invalidate initial disk addition placement decisions, due to an inability to replace the failed disk with a new disk of identical size. In such a situation, it is desirable to provide both atomic and best-effort disk addition semantics. In a best-effort disk addition, disks are added as zeroing completes and failure of a disk during the zeroing procedure does not prevent other disks from being added. In an atomic disk addition, either all disks must be added to the volume or none of the disks are added.

SUMMARY OF THE INVENTION

The present invention overcomes the disadvantages of the prior art by providing a technique for managing the addition of disks to a volume of a storage system. According to the technique, a disk addition procedure is encapsulated into a novel DISKADD object conforming to a configuration management framework used to implement a RAID sub-system of the storage system. The DISKADD object (and disk addition procedure) is responsible for determining a set of available disks required to satisfy a disk addition request issued by an operator through a user interface of a storage operating system executing on the storage system. Furthermore, the DISKADD object is responsible for monitoring the state of the available disks, including preparation/initialization of the disks (e.g., disk zeroing) and possible disk failures, as well as placing those disks into RAID groups of the volume once preparation completes. Persistent storage of the state of a pending disk addition is then accomplished using an implementation of the configuration management framework.

Specifically, the DISKADD object is responsible for the policy associated with adding available disks into a mirrored or unmirrored volume. Each DISKADD object contains one or more disk container objects, depending on whether the target volume is unmirrored or mirrored. A disk container object is responsible for grouping individual disks and propagating disk initialization (e.g., zeroing) success or failure status of each disk to its parent object, in this case the DISKADD object. In addition, the DISKADD object encapsulates a placement procedure to place selected available disks into a requested context (e.g., the volume). An operator may specify a count of disks to be added to a volume, a disk size and/or specify exactly those disks to be added; otherwise, the DISKADD object may select the disks to be added. In response, the placement procedure analyzes the disk selection against known locality and placement criteria. The procedure also determines an optimum set of available disks that match the criteria of the target volume's existing RAID topologies, e.g., mirroring, checksum characteristic, zeroing characteristic, parity, data disk sizing and/or RAID group size.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
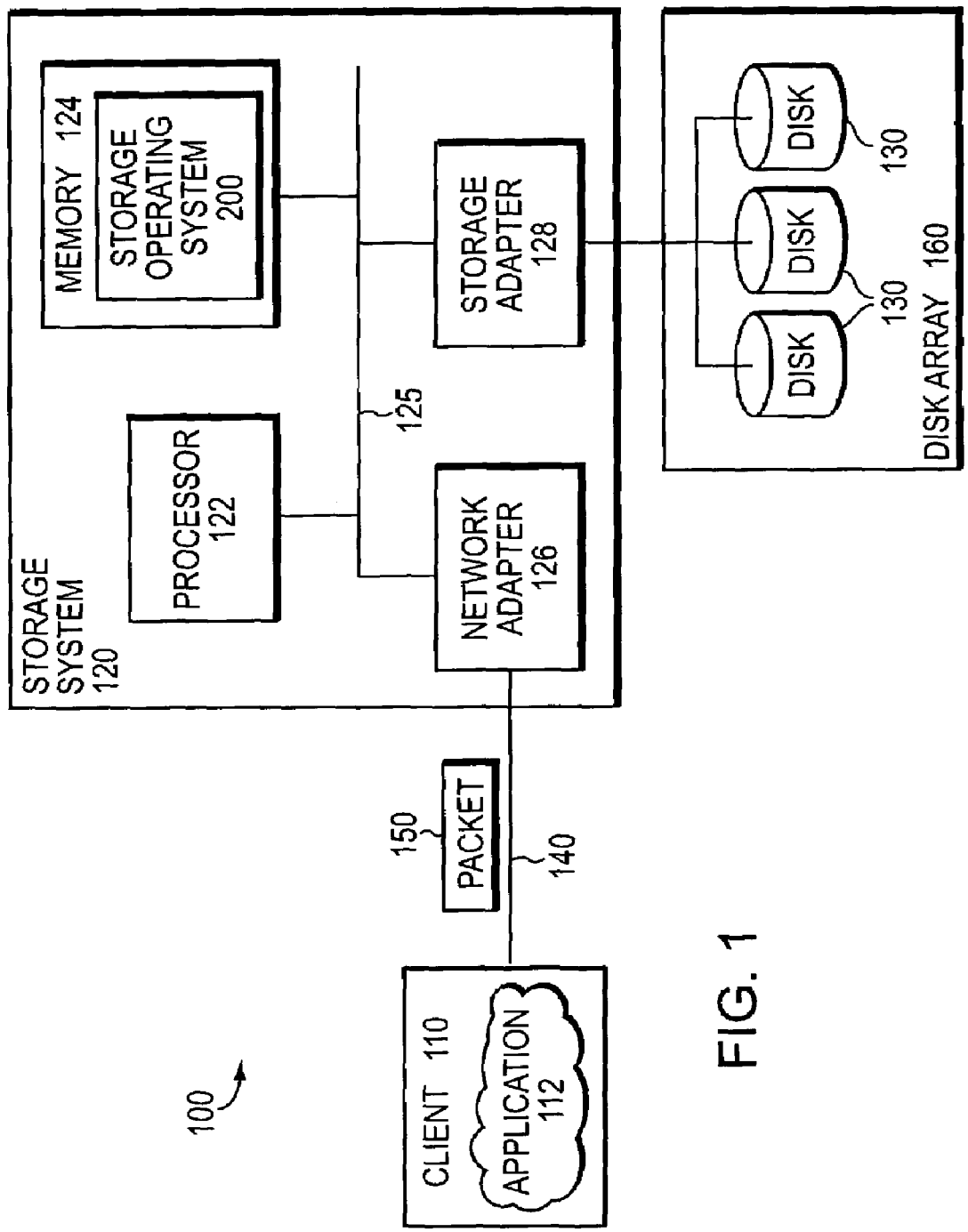
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a file system to logically organize the information as a hierarchical structure of directories, files and virtual disks (hereinafter "blocks") on the disks.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel Protocol (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of disk space on the volume(s). Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. Although a RAID-4 level implementation is illustratively described herein, it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system including, for example, a write in-place file system, may be enhanced for use in accordance with the inventive principles described herein. As such, where the term "WAFL" is employed, it should be taken broadly to refer to any storage operating system that is otherwise adaptable to the teachings of this invention.

Figure 2:
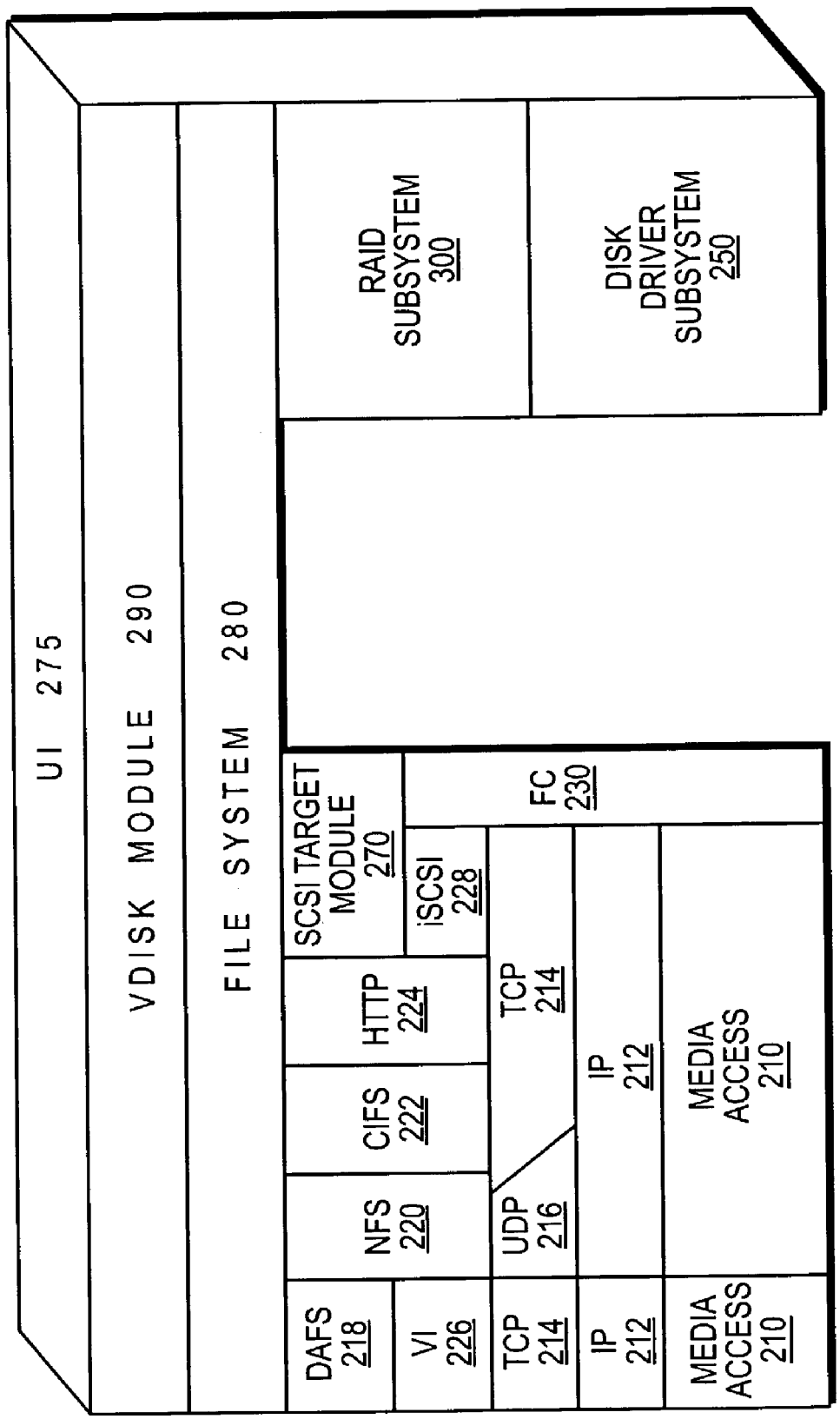
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage device manager embodied as a RAID subsystem 300 that manages the storage and retrieval of information to and from the volumes/disks in accordance with I/O operations, and a disk driver subsystem 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to various layers and subsystems, such as the RAID subsystem 300.

The file system is illustratively a message-based system that provides volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system having an on-disk format representation that is block-based using, e.g., 4 kilobyte (kB) blocks and using index nodes ("inodes") to identify files and file attributes (such as creation time, access permissions, size, and block location). The file system uses files to store metadata describing the layout of its file system; these metadata files include, among others, an inode file. A file handle, i.e., an identifier that includes an inode number, is used to retrieve an inode from disk.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it onto a network protocol and file access layer for additional processing prior to forwarding to the file system layer 280. Here, the file system generates operations to load (retrieve) the requested data from disk 130 if it is not resident "in core", i.e., in the memory 124. If the information is not in memory, the file system 280 indexes into the inode file using the inode number to access an appropriate entry and retrieve a logical volume block number (VBN). The file system then passes a message structure including the logical VBN to the RAID subsystem 300, which maps that logical number to a disk block number (DBN) and sends the latter to an appropriate driver (e.g., SCSI) of the disk driver subsystem 250. The disk driver accesses the DBN from disk 130 and loads the requested data block(s) in memory 124 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server or filer) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
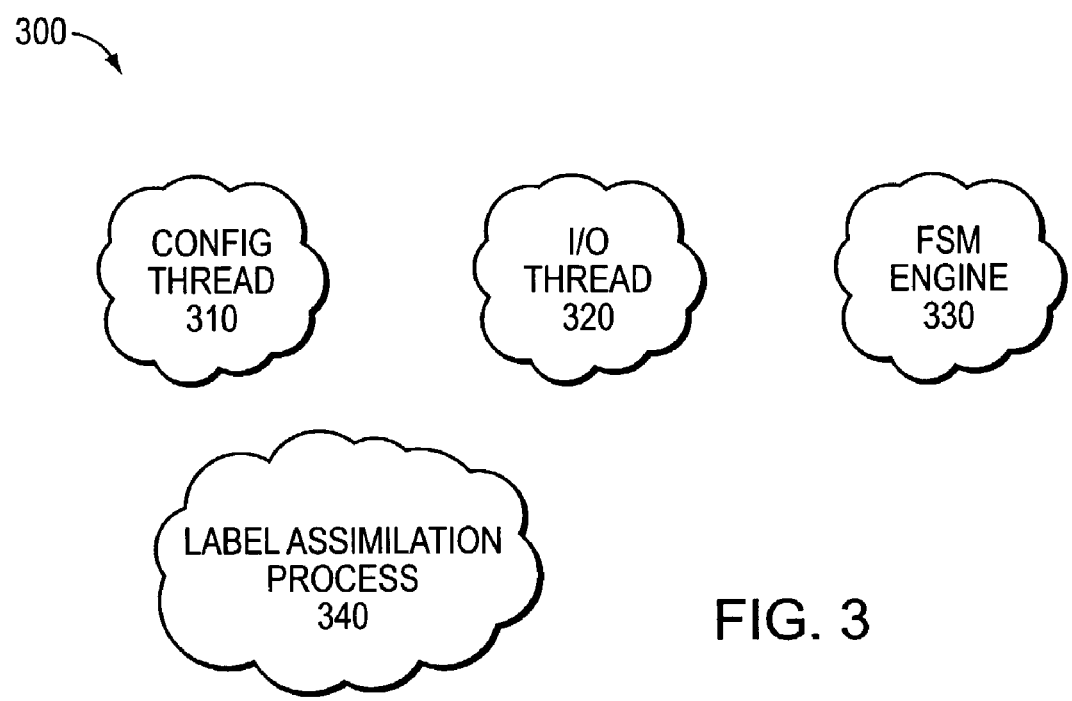
FIG. 3 is a schematic block diagram illustrating processes and threads of a RAID subsystem of the storage operating system of FIG. 2.

The present invention is implemented in the context of a configuration management framework used to implement the RAID subsystem 300 in the storage operating system 200. In a preferred embodiment, the configuration management framework provides an object-oriented approach to RAID configuration management, as described herein with respect to an implementation of the RAID subsystem. FIG. 3 is a schematic block diagram illustrating one or more modules or processes and threads of the RAID subsystem 300, wherein each process has, among other things, a (virtual) memory address space, executable code and data. A process is started with a single thread, but can create additional threads from any of its threads. The threads execute in the same memory address space and can therefore work concurrently on shared data. For example, an instantiator module implements a configuration (config) thread 310 adapted to maintain relationships among and invoke behaviors of decomposed software components ("RAID objects") that collectively form the behaviors associated with a collection of (RAID) volumes on the storage system. In addition, an I/O manager module implements an I/O thread 320 configured to issue I/O transaction requests from the RAID subsystem to the disk driver subsystem and, upon completion, process the results.

A finite state machine (FSM) module or engine 330 is used to arbitrate a set of events and states that a process or thread of the RAID subsystem may encounter. Trans-actional semantics isolate the behavior of state changes in the RAID subsystem from concurrent I/O operations. The framework provides a two-phase commit procedure, coordinated with updates to on-disk configuration data ("labels"). Errors during disk label updates are handled by aborting the transaction, releasing partially committed data and unwinding any pending state transitions. A state notification mechanism integrated with the FSM engine 330 propagates state changes through the threads in order to provide a coordinated behavior.

According to the configuration management framework, a volume comprises the aggregate behavior of a number of RAID objects. Each RAID object ("object") comprises operational code and static state, such as configuration information, relating to the topology of the underlying physical storage devices, e.g., disks 130, contained in disk array 160. The objects are organized into a configuration tree with configuration interfaces defining a set of services provided by one or more processes of the RAID subsystem. Although the objects may be implemented in accordance with an object-oriented programming paradigm, the present invention is not limited to such an implementation. More broadly, the objects of the configuration tree refer to abstract entities representing a logical combination/configuration of the disks. That is, the objects are used to present a view of the underlying topology of the storage array managed by the RAID subsystem.

Figure 4:
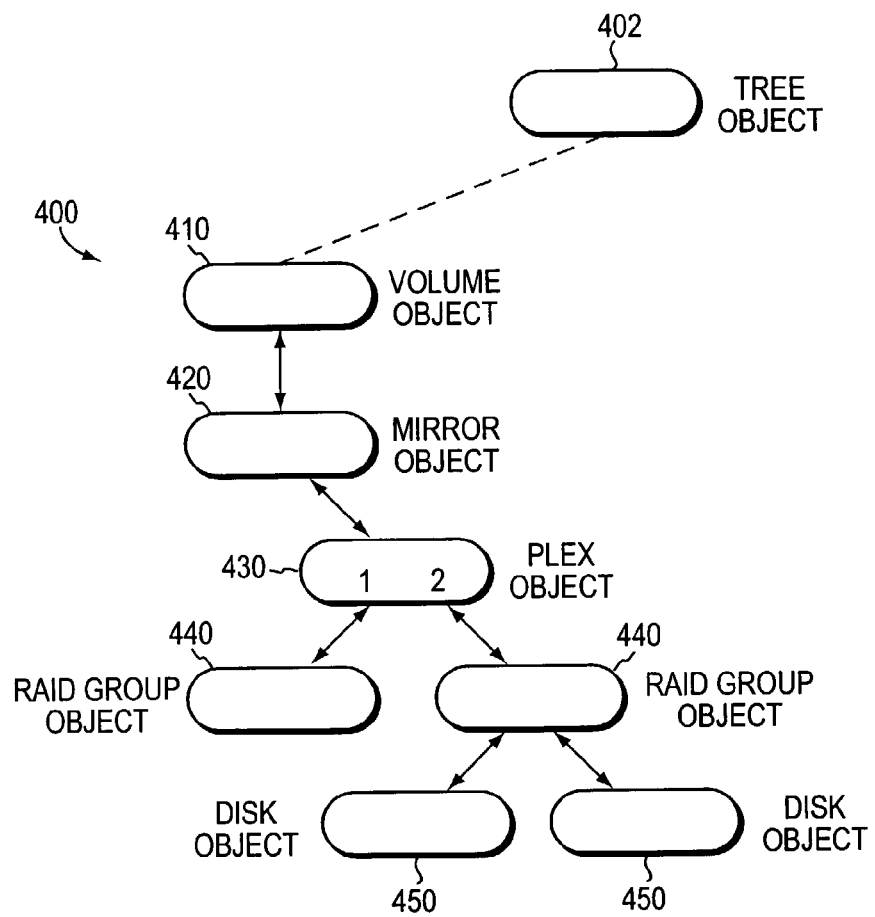
FIG. 4 is a schematic block diagram of an in core representation of an embodiment of a RAID configuration tree structure in accordance with a configuration management framework that may be advantageously used with the present invention.

FIG. 4 is a schematic block diagram of an in core representation of an embodiment of a RAID configuration tree structure 400 in accordance with the configuration management framework. The configuration tree 400 comprises a plurality of objects arranged by the RAID subsystem into levels that cooperate to organize one or more physical disks into a single logical volume. References between objects (e.g., between a superior "parent" object and each of its subordinate "children" objects) are bi-directional memory address pointers that enable each child to reference its parent (and vice versa). These pointers are part of the metadata stored within each of the objects.

Objects have an associated type, with each object type providing its own implementation of the configuration interfaces. A volume is organized into a hierarchical configuration tree of objects that includes a tree object 402 responsible for coordinated behavior with the file system and a volume object 410 responsible for managing the RAID aspects of volume management. Specifically, the volume object 410 represents the (WAFL) file system at the highest level (i.e., root node) of the configuration tree 400. To that end, the volume object 410 stores metadata that describes a volume/file system, wherein the metadata includes information such as the name of the volume and address range (in physical blocks) of the volume. The name of the volume resides in a volume namespace that is exported by the UI 275 of the storage operating system 200. The logical address space of the file system is mapped to the physical (block) address space in the RAID subsystem 300.

The configuration tree 400 and, in particular, the volume object 410 represent a logical disk that is presented to the file system by the RAID subsystem as a "container" for the file system to store its data. That is, the objects of the configuration tree are organized to create an address space that resembles a single logical disk but, in reality, comprises a plurality of physical disks. In this context, the volume object 410 is equivalent to the tree object 402, wherein the tree object stores additional metadata about the logical volume that is presented to the file system. This additional metadata includes the type (level) of parity implementation configured for the particular volume (e.g., RAID-4, RAID-0, mirror-_RAID-4, mirror_RAID-0, RD parity). Since the tree object is a one-to-one representation of the volume, the additional metadata stored in the tree object includes redundant information about the volume, such as its name and physical address/block range.

A next object level comprises a mirror object 420 that is responsible for coordinating one or more copies of the volume (termed "plexes") in support of data mirroring. In synchronous data mirroring, two "mirror" copies are provided that are at all times synchronized. That is, changes to the data in one mirrored copy are immediately reflected in the other mirrored copy. The two identical mirrored copies have matching address spaces that are within the volume address space and that provide identical synchronized full copies of the data in the volume.

A plex object 430 is responsible for managing an instance of a copy of volume data and thus represents each mirrored copy within another object level of the configuration tree. Whereas the mirror object 420 stores metadata that is used to coordinate one or more copies (or plexes) of the volume in support of data mirroring, each plex object 430 stores metadata that is used to manage an instance of a copy of volume data. The plex object may include an ordinal placement (e.g., 1, 2) indicating that, for example, a first part (1) of the address space is associated with a particular RAID group and that a second part (2) of the address space is associated with another RAID group.

A next object level comprises one or more RAID group objects 440 per plex object. Each RAID group object 440 contains metadata that provides data protection and I/O coordination over a set of disks. The metadata of the RAID group object includes information such as the number of disks within the RAID group and the address (block) range of each disk within the RAID group. In this context, a RAID group is defined as a number of disks and the address/block space associated with those disks. Finally, there is another object level comprising one or more disk objects 450 per RAID group object, wherein each disk object 450 contains metadata that provides data access to the physical disks 130.

The configuration tree 400 is constructed in the memory 124 of the storage system 120 by a label assimilation process 340 of the RAID subsystem 300. According to the assimilation process, each disk associated with a volume includes a label that describes its placement and association with that volume. The on-disk label is, in essence, self-describing information for each disk that is actively attached to the storage system 120. The labels are used to dynamically assemble the disks into a volume and to construct an in core configuration tree 400 for that volume, starting from the disk object level up to the volume object level. Therefore, a label on a disk identifies that disk's participation in a RAID group and, furthermore, that group's association with plex, mirror and, ultimately, volume objects in the configuration tree. The label is located in a well-known location of the disk so that it can be queried by the RAID subsystem in accordance with, e.g., a discovery process during a boot operation.

Each object type instance of the configuration tree 400 comprises the following components: service interfaces, committed transactional state, pre-committed transactional state (trans area) and non-transactional state. The service interfaces comprise an application programming interface (API) that the object exports to other software components. In the illustrative embodiment, the service interfaces include initialization and destruction, child object management (add, replace), online/offline, transaction management (join, commit, abort, label I/O, state change notify), virtual block management, and I/O handling (context creation/deletion, resource management, I/O throttling). Each object type defines the commit, pre-committed, and non-transactional state that it holds. The transaction management interfaces are provided as a mechanism to create and modify transactional state in a manner that is coordinated across all objects in a volume.

The basic flow of control starts with a configuration management operation issued by, e.g., the file system 280 and received by the RAID subsystem 300. The file system passes the configuration management operation in the form of a message request that specifies a target volume and defines a named operation with specific parameters. The configuration thread 310 of the RAID subsystem receives the request and determines the object (e.g., volume, RAID group) of the configuration tree 400 for the volume to which the request is directed. The configuration thread then locates the tree object 402 for the volume and invokes relevant configuration operations using service interfaces of the appropriate object. When a service interface is invoked, the object is transparently "joined" to the request prior to activation of the interface. Joining of an object to a request results in copying of the currently committed state into a pre-committed state area (called the trans area of the object). The trans area is a portion of memory that records changes to the object that are pending commitment. The service interface makes its changes to the trans area. If the changes to the object result in a change of the state of the object, the FSM engine 330 is invoked.

The FSM engine 330 provides a critical component in managing the interrelationship between objects in a RAID volume. Specifically, the FSM engine defines the state/event pairs that are "legal" and, for each state/event, provides a mechanism to implement the invocation and determine any subsequent state transitions. In addition, the FSM engine provides tracing mechanisms to track the set of transitions that have occurred and provides object notification for pre-committed and committed state transitions. More specifically, the FSM engine 330 is responsible for determining the new state of the object (based upon a per object type state/event table) and invoking the state notification interface of its "superior" object in the volume hierarchy. The FSM engine includes an upward notification mechanism (e.g., from child to parent object) to notify the parent object about a state change in the child object.

When the configuration request completes all service interface invocations, it requests a label commit operation to persistently store the modified state. The label commit "pulls" data from the trans area in order to construct its new version of the label data. Label commit is deemed to be successful only if all labels in a plex can be successfully written. Once all labels have been successfully written, each object that has been joined to the request is responsible for copying its trans area data back to the committed state portion of the object. If labels are not successfully written, the trans area is discarded, any disk failures are identified and resulting configuration changes are initiated, the successfully written labels are re-written with the previous state, and the original configuration request is retried.

The present invention is directed to a technique for managing the addition of disks to a volume of a storage system. In particular, the technique allows a user (operator) to enter disk addition requests through, e.g., a command line interface (CLI) or similar administrative interface of the UI 275 associated with the storage system, to thereby create a RAID volume, expand a volume by adding available disks to an existing configuration or add disks to "mirror" an existing configuration of a volume. Creation of a volume is effected by the operator entering a vol create CLI command. The vol create command establishes an initial address space for the volume; as described herein, a vol add CLI command expands the volume address space. A vol mirror CLI command upgrades an unmirrored volume to a volume that has synchronous mirror protection. Mirroring, however, does not expand the address space of the volume.

According to the invention, a disk addition ("DISKADD") object encapsulates a disk addition procedure in a manner that conforms to the configuration management framework. The DISKADD object (and disk addition procedure) is responsible for determining the set of available disks required to satisfy a disk addition request issued by, e.g., the operator or a requirement imposed by the system. Furthermore, the DISKADD object is responsible for monitoring the state of the disks, including preparation/initializatiion of the disks (e.g., disk zeroing) and possible disk failures, as well as placing those disks into RAID groups of the volume once preparation completes. Persistent storage of the state of a pending disk addition is then accomplished using an implementation of the configuration management framework.

Figure 5:
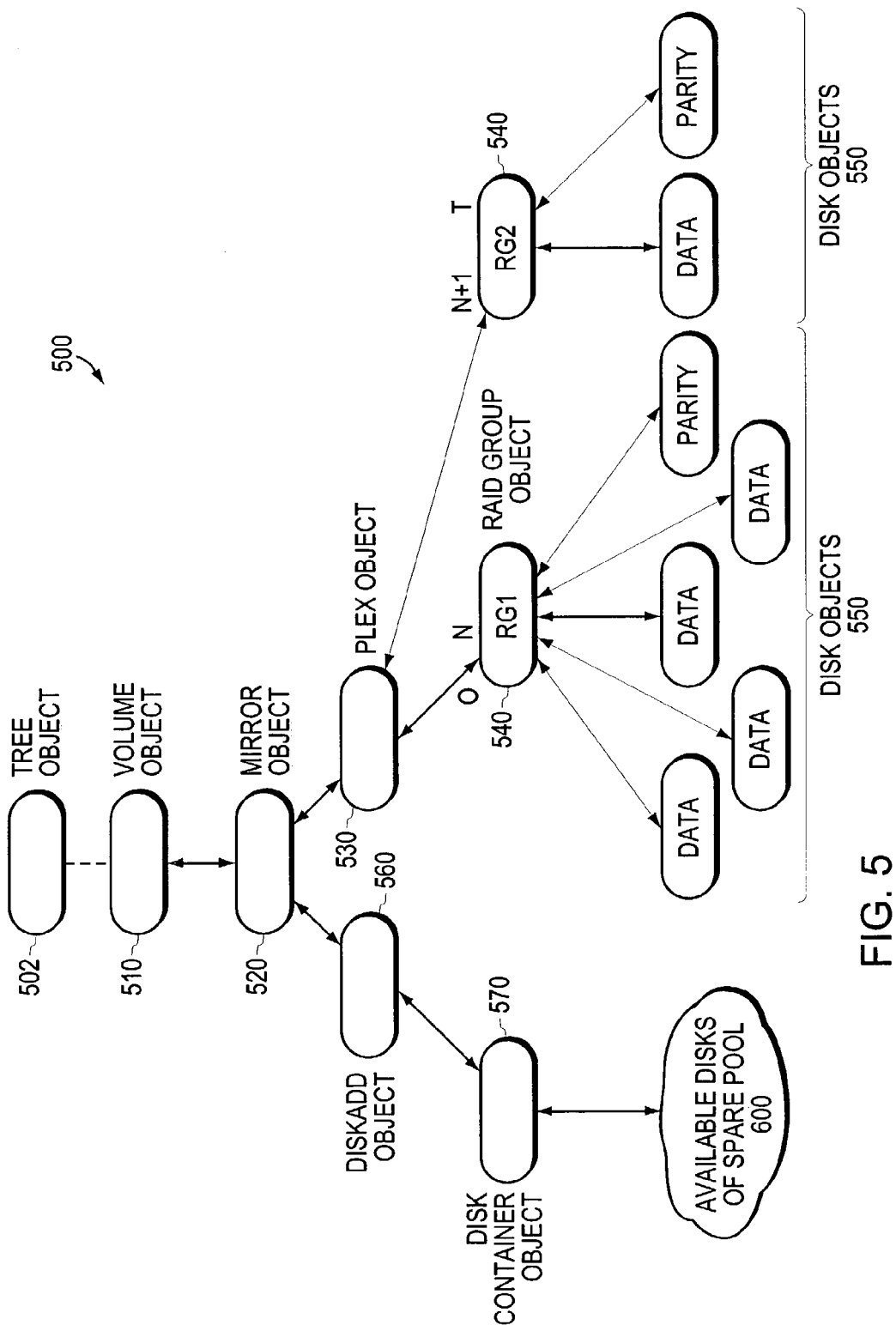
FIG. 5 is a schematic block diagram of an in core representation of another embodiment of a RAID configuration tree including a DISKADD object in accordance with the present invention.

FIG. 5 is a schematic block diagram of an in core representation of another embodiment of a RAID configuration tree 500 including the DISKADD object 560. As with the configuration tree 400, configuration tree 500 includes a tree object 502 responsible for coordinated behavior with the file system, a volume object 510 responsible for managing the RAID aspects of volume management, a mirror object 520 responsible for coordinating one or more plexes in support of data mirroring and a plex object 530 responsible for managing an instance of a copy of volume data. The configuration tree 500 also includes one or more RAID group objects 540 responsible for data protection and I/O coordination over a set of disks, and disk objects 550 responsible for data access to the physical disks 130.

When creating a volume, the operator may specify a RAID group size. For example, if a RAID group size of "5" disks is chosen for a RAID-4 level configuration, then four of the disks are treated as data disks and one disk is a parity disk. Thereafter, every RAID group that is created has a RAID group size of five disks. The RAID group size parameter is included within the metadata stored in the volume object 510. As new disks are added to a volume, those disks are added to an existing RAID group until the RAID group size is satisfied. Once the RAID group size is satisfied, a new RAID group object 540 is instantiated and the disk objects 550 representing the added disks are associated with the newly-instantiated RAID group object.

The RAID group size specification essentially limits the number of disks per RAID group. As additional disks are added, new RAID group objects 540 are instantiated for each new group of disks up to a maximum of, e.g., five disks. Moreover, as disks are added and as additional RAID groups are instantiated, the address/block space can be dynamically increased. For example, assume a first RAID group (RG1) has an address space from 0 to n. When a subsequent RAID group is instantiated (RG2), the address space is then dynamically increased from n+1 to t. The address space dynamically increases by adding one or more disks (disk objects 550) to the volume. A minimum of two disks need to be added to a newly instantiated RAID group for a RAID-4 level configuration, as one of the disks must be a parity disk. Therefore, as additional disks are added to the volume, they are associated with RG2 until the maximum number of five disks for the RAID group size is reached. At that point, any additional disks "fall over" to yet another instantiation of a RAID group, e.g., RG3.

An operator adds one or more disks to an existing volume by issuing a disk addition request, such as the vol add command. An example of the vol add command is:

vol add<volumename><number> wherein the <volumename> parameter indicates the name of the target volume, e.g., vol2, and the <number> parameter indicates the number of disks, e.g., two (2), to be added to the volume vol2. As a result of the disk addition CLI command request, the DISKADD object 560 is created.

The DISKADD object 560 is a temporary object that is associated with a RAID volume and that is instantiated (exists) only for the duration of the process of adding one or more disks to a RAID group of the volume. For example, since the vol add command is directed to a specific volume (vol2), the DISKADD object is associated with a vol2 volume object 510 or, in the illustrative embodiment, a mirror object 520. In alternate embodiments, the DISKADD object 560 may be associated with other container objects (e.g., plex or RAID group objects) in order to support different placement algorithms and/or scope. The DISKADD object 560 is responsible for the policy associated with adding disks to a mirrored or non-mirrored volume and, as such, stores information pertaining to the actual request (vol add command) issued by the operator.

One or more disk container objects 570 are associated with each DISKADD object, depending on whether the target volume is non-mirrored or mirrored. Each disk container object 570 groups a set of available disks and propagates disk preparation (e.g., zeroing) success or failure status of each individual disk to the DISKADD object. The functionality of the disk container object 570 differentiates it from the DISKADD object; that is, the disk container object includes the number of children (disk) objects associated with the spare pool and maintains/collects the status of those disk objects. For example, the disk container object 570 collects preparation (zeroed, zeroing and failed) status of the disks. The DISKADD object 560 examines the collected status and decides whether (i) the disks are ready to be added to a RAID group, (ii) the disk addition operation should abort due to disk failure or (iii) the operation should wait for zeroing to complete. In sum, the DISKADD object 560 and its associated disk container object 570 are responsible for acquiring the disks specified in the vol add command along with matching the characteristics specified (if any) in the command.

Figure 6:
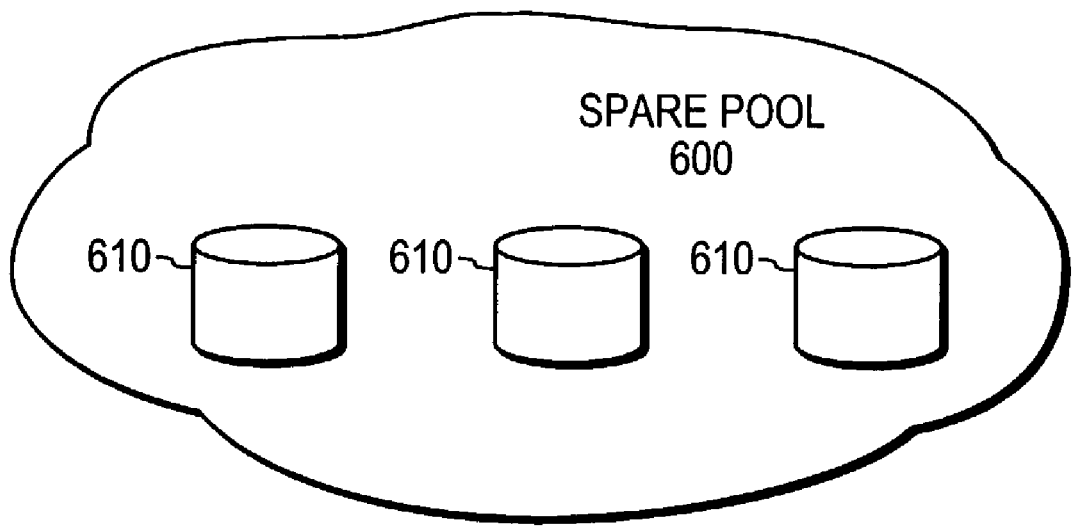
FIG. 6 is a schematic block diagram illustrating available disks of a spare pool and various characteristics associated with the disks.

FIG. 6 is a schematic block diagram illustrating available disks 610 of a pool (hereinafter "spare" pool 600) and characteristics associated with those disks. Various characteristics of the added disks may be specified by an operator in accordance with a disk addition request, such as the vol add command. An example of a spare pool 600 of available disks (hereinafter "spare" disks 610) is a disk shelf having spare disks that have yet to be allocated to a volume. In general, there are two allocation steps that occur when adding disks to a volume. First, disks 610 are allocated from the spare pool 600, at which point the disks 610 are "moved into" (associated with) the disk container object 570. After preparation of the disks complete, the spare disks are allocated from the disk container object 570 for placement ("pushing") into a RAID group. It should be noted that a RAID group has a specific interrelationship among its constituent disks, i.e., once pushed into a RAID group, each disk participates within a defined address space of the volume.

Spare disks 610 that can be "seen" by the storage system are apportioned into spare pools 600 according to rules that determine ownership and fault isolation of these disks. Ownership rules determine whether a spare disk is owned by the "local" storage system or another storage system. The fault isolation rules ensure that the spare disks in each spare pool share no single point of failure in their connectivity to the storage system with respect to spare disks of other spare pools. The disks in each spare pool 600 are managed by a spare disk manager (DMGR) object; a select-query-allocate (SQA) manager of the RAID subsystem is responsible for the behavior of the DMGR object and, further, implements a spares management technique to select disks to be added to one or more RAID groups of a volume. An example of a DMGR object, SQA manager and spares management technique that can be advantageously used with the present invention is described in co-pending U.S. patent application Ser. No. 10/394,819 titled Query-Based Spares Management Technique, which application is hereby incorporated by reference as though fully set forth herein.

The DISKADD object cooperates with one or more DMGR objects via the SQA manager to select spare disks for addition to RAID groups of a volume. Interaction between the DISKADD object and SQA manager is manifested in the form of select-query and allocation requests. Broadly stated, the DISKADD object interacts with one or more DMGR objects through the SQA manager depending upon whether the target volume is a synchronous mirrored volume. The DISKADD object specifies to the SQA manager its desired disk selection criteria through selection criteria queries and priority ordering. The DISKADD object forms the disk selection criteria to satisfy a disk addition request issued by, e.g., either an operator (user) through a user interface or by an object of the configuration tree. The SQA manager replies to each query with a summary report indicating a count of disks that match the selection criteria. The DISKADD object may make a series of queries to determine an optimum allocation request. Based on the query results, the DISKADD object eventually submits an allocation request to the SQA manager, at which point spare disks are moved from the spare pool and into the corresponding disk container object 570 associated with the DISKADD object.

The selection criteria provided by the DISKADD object comprise disk characteristics, examples of which include, but are not limited to, (i) identification of spare pools, (ii) sector size of each disk, (iii) capacity of each disk, (iv) preparation (e.g., zeroing) status of each disk and (v) physical locality of the disks. The physical locality of the disks includes considerations such as the disk shelf where the added (spare) disks are located, the disk port connection, and the physical adapter in the storage system. The desired physical locality of the disks is made with respect to each selected disk and to disks that are already allocated to a volume.

Identification of the spare pool is used during the process of selecting and allocating spare disks 610 from a spare pool 600. The parameters associated with the sector size characteristic are illustratively "512" or "520", which pertain to a checksum type. The checksum type or sector size is an attribute of the metadata stored in the tree object 502. The checksum type and the RAID level attribute stored in the tree object 502 determine the level of RAID implementation as well as the sector size that any additional disks inherit and conform to as a result of being added to a RAID group.

The capacity characteristic has two components including the total size or storage space of the disk and the actual amount of space that is being utilized at any given time. When disks of different sizes are joined together in, e.g., a RAID group, a process called "down sizing" is performed to utilize only as much storage space on the larger size disks as is necessary. For example, if there is a mixture of 36 gigabyte (GB) and 72 GB disks, the larger 72 GB disk is apportioned into 36 GB so as to conform to the size of the other disks in the RAID group. The DISKADD object down sizes a disk not only for performance purposes, but also for mirroring purposes to match the sizes of the disks in the other mirror plex(es). The preparation status is a characteristic that, in the case of zeroing, indicates whether the disks 610 of the spare pool 600 have been previously zeroed. A requirement of the WAFL file system is that all blocks on a disk be zeroed to enable proper calculation of checksums. Before any disk is placed into a RAID group or a volume, that disk is pre-zeroed.

In the illustrative embodiment, two modes of disk addition are provided: (1) an atomic mode where either all disks are added or none are added, and (2) a best effort mode where the RAID subsystem makes a "best efforts" attempt to give the operator what is requested. An example of best efforts mode is if, during zeroing, a disk fails then instead of, e.g., three disks being added to the volume only two disks will be added. Note that in the case of an n-way mirror (e.g., n=2), the atomic mode of disk addition is performed to the plex tuples (pair) on a disk-by-disk basis in order to prevent the added disks of one plex from being mismatched size-wise with disks of any other plex.

According to an aspect of the inventive technique, the DISKADD object 560 encapsulates a placement procedure to place selected disks into a requested context (e.g., a volume). An operator may specify a count of disks to be added to a volume, a disk size and/or specify exactly those disks to be added using, e.g., a mode of the vol create, vol add or vol mirror commands; otherwise, as noted, the DISKADD object selects the disks to be added. In response, the placement procedure analyzes the disk selection against known locality and placement criteria. In addition, the procedure determines an optimum set of available disks that match the criteria of the target volume's existing RAID topologies, e.g., mirroring, checksum characteristic, zeroing characteristic, parity, data disk sizing and/or RAID group size.

Examples of placement criteria utilized by the DISKADD object 560 when, e.g., pushing a disk into a volume, include (i) whether the volume is mirrored, non-mirrored or being upgraded to a mirror, (ii) the RAID group size for the volume, which determines whether the spare disk can be pushed into the last RAID group in a plex or whether it "falls over" into the next RAID group for that plex, and (iii) whether the spare disk is a first disk added to a RAID group because the first disk added to a RAID group is the parity disk for that group. Other placement criteria examples include (iv) the capacity of the disk being pushed with respect to other disks currently in the RAID group; this criterion ensures that if the pushed disk is larger than the current parity disk, the two disks are "flipped" in accordance with a parity flipping procedure so that the parity disk is at least as large as the largest data disk in the RAID group, and (v) ensuring that the disk is not pushed into the volume until it has completed the preparation status process (e.g., zeroing).

As noted, the DISKADD object generates disk selection criteria to satisfy a disk addition request issued by an operator. If it is determined that the request cannot be satisfied, the DISKADD object returns an error code to the operator, indicating the reason for failure. If the request can be satisfied, the DISKADD object 560 selects the disk(s) 610 from the spare pool 600 and places them into the disk container object 570. The DISKADD object "stamps" each selected disk with placement information that specifies the RAID group to which the disk will be added when it is ready. The placement information facilitates grouping of similarly sized disks by the disk container object and placement of those disks into the same RAID group to improve performance.

As a result of the disk placement information provided by the DISKADD object, RAID groups can have non-contiguous VBN address spaces, i.e., disks can be added to any RAID group. Assume the RAID groups of a volume have a RAID group size of "5" and an operator subsequently increases that size to "7". The operator can specify the addition of two disks to the first-established RAID group using, e.g., the vol add command, using the placement information provided by the DISKADD object for the added disks. This aspect of the invention provides the flexibility for an operator to add disks to any RAID group. If the operator does not specify the group to which the disks are added, the default behavior adds the disks to the last-established RAID group.

Notably, the state of the disk addition is stored on a predetermined disk(s) to provide persistent storage of the disk addition state in accordance with the configuration management framework. Persistent storage of disk addition state allows continued use of the DISKADD object across reboot operations of the storage system. For example, once a DISKADD object 560 is instantiated, its progress (e.g., which spare disks 610 were successfully allocated and moved into the disk container object 570) is stored on stable storage. Subsequently, if interruption of the system occurs, the current state of the disk addition request is preserved. Upon reboot, processing of that DISKADD object (and the disk addition request) can resume from the current state.

Figure 7A:
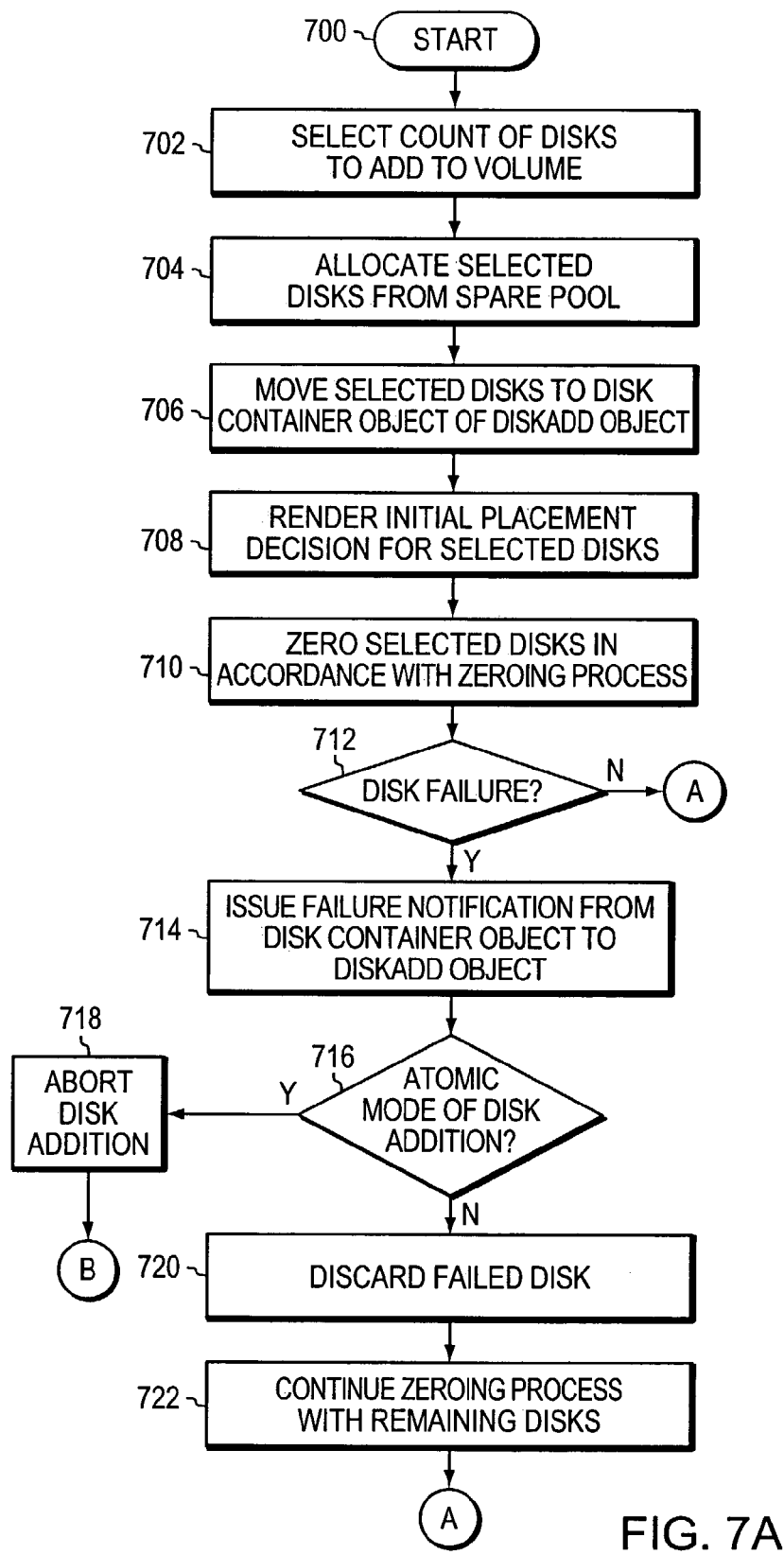
FIGS. 7A and 7B are flowcharts illustrating a sequence of steps for managing the addition of disks to a volume of the storage system in accordance with the present invention.
Figure 7B:
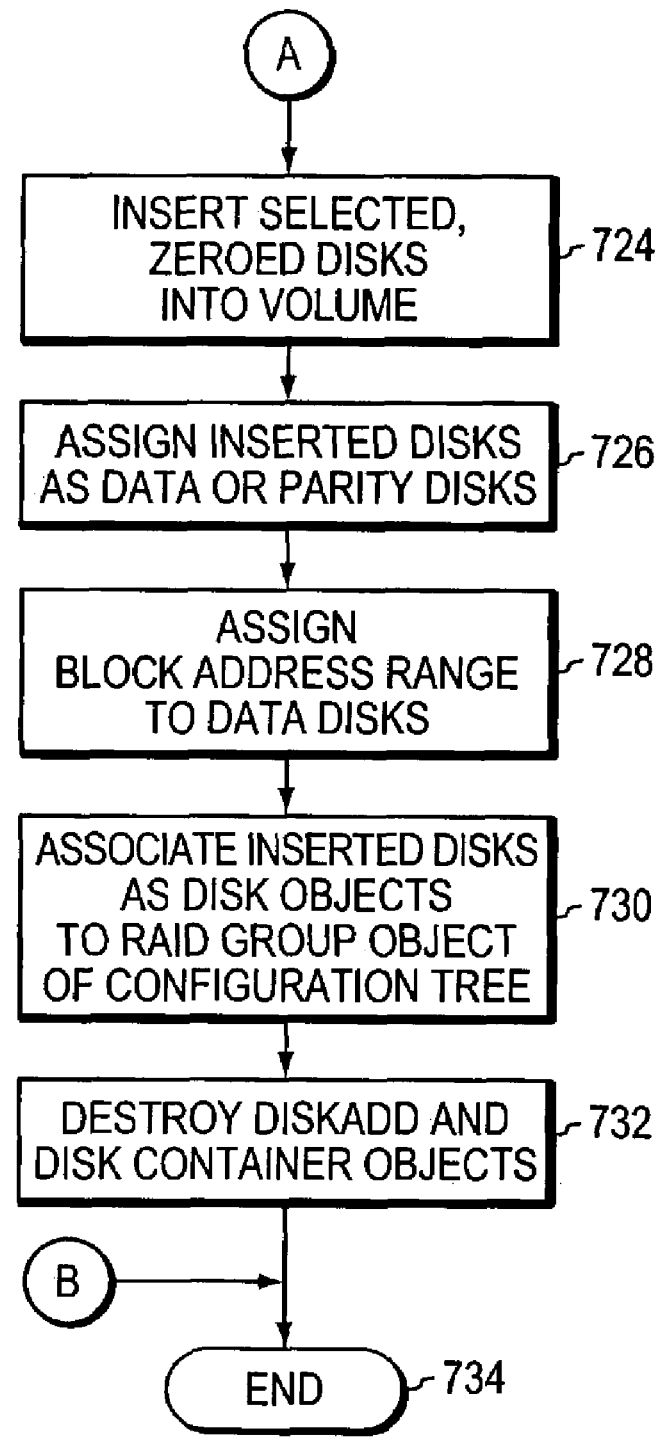

FIGS. 7A and 7B are flowcharts illustrating a sequence of steps for managing the addition of disks to a volume of the storage system in accordance with the present invention. The sequence starts at Step 700 and proceeds to Step 702 where an operator selects a count of spare disks to be added to the volume in accordance with a disk addition request. Here, assume that the operator selects three spare disks 610 from the spare pool 600 that are all of uniform size (e.g., 32 GB) and are all not zeroed. In Step 704, the selected disks are allocated from the spare pool 600 and, in Step 706, the selected disks are moved into the disk container (child) object 570 associated with the DISKADD object 560 of configuration tree 500. As noted, the configuration thread 310 maintains the relationships of all the objects within a configuration tree. Specifically, the configuration thread interacts on behalf of the volumes to create and destroy the relationships of the objects in the configuration tree 500. These relationships include, among others, the allocation and insertion of disks to a RAID volume using the DISKADD and disk container objects.

The selected disks are then prepared for placement into a RAID group of the volume. To that end, an initial disk placement decision is rendered by the placement procedure in Step 708. For example, the placement decision may elect to place (add) the selected disks into the volume subject to the following constraints: (1) conformance with the parity protection level minimum disk requirement, e.g., a RAID-4 level group requires a minimum of two disks, and (2) mirrored volumes require pair-wise atomic addition of individual disks. Note that the DISKADD object places the selected disks into RAID group(s) after preparation (e.g., zeroing) of the disks has completed. Completion of disk zeroing for placement into a RAID group is only a requirement for RAID-4 or RD parity implementations. For a RAID-0 level implementation, zeroing is not required prior to placement of a selected disk into a RAID group.

In Step 710, the selected disks are zeroed in accordance with a zeroing process comprising a series of I/O operations. The zeroing process generally involves communication between the RAID subsystem 300 and the disk driver subsystem 250 (e.g., a SCSI driver) wherein the I/O operations are directed to writing "0" to the blocks of the disk. Each disk is organized into regions and the zeroing I/O operations are directed to one region at a time until the entire disk is zeroed. Note that the selected disks remain associated with the disk container object 570 until the zeroing process is complete.

In Step 712, a determination is made as to whether a disk fails during zeroing. If so, the disk container object 570 containing the disk issues a failure notification to the DISKADD object in Step 714. At this point, the placement procedure may elect to reevaluate all initial placement decisions in order to allow for swapping the failed disk with a replacement disk newly allocated from the spare pool 600. Thereafter, in Step 716, a determination is made as to whether an atomic mode of disk addition is specified by the disk addition request. If so, the entire add request is aborted in Step 718 and the sequence ends at Step 734. If the disk addition mode is not atomic but rather best effort, the failed disk is discarded (along with the matching mirrored target disk) in Step 720 and the zeroing process continues with the remaining disks in Step 722.

If there is no disk failure during zeroing (i.e., preparation of the selected disks complete), a "push" process executes whereby the selected disks are allocated from the disk container object 570 and pushed (inserted) into the volume (or, more particularly, into the appropriate RAID group) in Step 724. In Step 726, the inserted disks are assigned as either data or parity disks and, for each data disk, a block (address) range is assigned in Step 728. Note that as the disks are pushed to the volume (RAID group) by the DISKADD object, the on-disk labels for each pushed disk is updated to reflect its placement with the volume.

In Step 730, the inserted disks are associated as children disk objects 550 with respect to a parent RAID group object 540 (RG2) of the configuration tree 500. This enables the inserted disks become participants of the address space of the volume, thereby rendering them capable of storing data. In Step 732, the DISKADD object 506 and its associated disk container object 570 are destroyed in accordance with a destroy method of each object. Note that the DISKADD object is also destroyed when all added disks fail and cannot be "pushed" (inserted) into the volume or RAID group. In other words, the DISKADD object is destroyed upon completion of an operation to add disks to a volume, whether that operation is successfully completed or not. The sequence then ends at Step 734.

In sum, the DISKADD object 560 is responsible for acquiring any number of disks specified by a disk addition request, such as the vol add CLI command. If that command specifies adding 2 or 10 disks, one DISKADD object is spawned to acquire those disks having any specified characteristics. The actual placement of those disks into the volume (RAID group) is determined by the volume object metadata as administered by the configuration thread 310 executing in the RAID subsystem 300. Therefore, the DISKADD object operates in concert with the volume object of the configuration tree as administered by the configuration thread 310 to place the requested added disks into the appropriate RAID group of the volume.

While there has been shown and described an illustrative embodiment for managing the addition of disks to a volume of a storage system, it is to be understood that various other adaptations and modifications may be made within the spirit and scope of the invention. For example, the disk addition technique described herein may be extended to provide a default priority ordering of disk characteristics. According to this aspect of the invention, a predetermined priority ordering of disk characteristics can be instituted in the event such an ordering is not specified by, e.g., an operator. This aspect of the invention further allows varying of the default policy in the DISKADD object, such that any policy can be attributed to that object.

For example, assume the storage of information on the storage system is configured as a synchronous mirror. According to the default priority ordering policy, the first disk characteristic of the default priority ordering may involve selection of a spare pool, e.g., the physical location of a disk shelf where the added disks are located. Subsequent disk characteristics of the default policy may be the sector size, followed by the capacity consideration and, finally, the disk zeroing/non-zeroing consideration.

A preferred embodiment of the invention has been described herein with reference to a file server having a storage operating system with a file system layer and a RAID subsystem (among other components), which manages file semantics in order to access data organized in files. It should be understood, however, that the invention can be practiced in any system or device that manages the addition of disks to a volume of a storage system, particularly in light of configuration management changes. One type of system or device in which the invention can be embodied is designed to perform a data storage function, and if so, may perform data-related operations, e.g., in response to data access requests. Such requests may use file-based and/or block-based semantics, depending on the implementation and, correspondingly, the system or device may organize data in files or in another manner. Moreover, such systems and devices may or may not incorporate features and functions described herein, such as, for example, a file system layer or a RAID subsystem, or may combine or otherwise modify their operation, without departing from the principles of the invention. Finally, the invention has been described herein using nomenclature such as "DISKADD" which may appear to be specific to implementations of the invention providing RAID functionality; however, the invention in its broader sense is not so limited.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for managing addition of disks to a volume of a storage system, comprising:
implementing a redundant array of independent disks (RAID) subsystem in a storage operating system of the storage system using a configuration management framework that provides a configuration tree adapted to organize a plurality of objects;

issuing a disk addition request through a user interface of the storage operating system to the RAID subsystem, the disk addition request selecting a count of available disks to be added to the volume;

adding and allocating the selected disks to a disk container object associated with a disk addition (diskadd) object of the configuration tree, the diskadd object encapsulating a placement procedure;

rendering an initial disk placement decision using the placement procedure;

inserting the allocated disks into a RAID group of the volume;

zeroing the allocated disks in accordance with a zeroing process;

determining whether an allocated disk fails during the zeroing process;

if an allocated disk fails, issuing a failure notification from the disk container object to the diskadd object;

determining whether an atomic mode of disk addition is specified by the disk addition request;

if the atomic mode is specified, aborting the disk addition request in response to the failure notification;

if the atomic mode is not specified, discarding the failed allocated disk;

continuing the zeroing process with remaining allocated disks;

associating the inserted disks as disk objects with respect to a RAID group object of the configuration tree to render the inserted disks capable of storing data; and destroying the diskadd and disk container objects in accordance with a destroy method of each object.

2. The method of claim 1 wherein the step of inserting the allocated disks comprises:

assigning the inserted disks as either data or parity disks; and for each data disk, assigning a block range.

3. The method of claim 2 further comprising: removing the selected disks from a spare pool of the storage system.

4. The method of claim 1, wherein the atomic mode requires all disks to be added to the volume or none of the disks are added to the volume.

\* \* \* \* \*

UNITED STATES PATENT AND TRADEMARK OFFICE
CERTIFICATE OF CORRECTION

| | | |
|---|---|---|
| PATENT NO. | : 7,424,637 B1 | Page 1 of 1 |
| APPLICATION NO. | : 10/394810 | |
| DATED | : September 9, 2008 | |
| INVENTOR(S) | : Scott Schoenthal et al. | |

It is certified that error appears in the above-identified patent and that said Letters Patent is hereby corrected as shown below:

<u>Title Page Assignee:</u>
Item (73) Assignee: should read as follows: Network Appliance, Inc.

Signed and Sealed this

Twenty-first Day of October, 2008

JON W. DUDAS
*Director of the United States Patent and Trademark Office*